United States Patent [19]

Scola

[11] Patent Number: 5,298,600
[45] Date of Patent: Mar. 29, 1994

[54] FLUORINATED CONDENSATION COPOLYIMIDES

[75] Inventor: Daniel A. Scola, Glastonbury, Conn.

[73] Assignee: United Technologies Corporation, Hartford, Conn.

[21] Appl. No.: 985,701

[22] Filed: Dec. 4, 1992

[51] Int. Cl.$^5$ .................... C08C 69/26; C08C 73/10
[52] U.S. Cl. .................... 528/353; 528/125; 528/126; 528/128; 528/170; 528/172; 528/173; 528/179; 528/185; 528/188; 528/220; 528/229; 528/350; 524/600; 428/473.5
[58] Field of Search ............... 528/353, 350, 125, 188, 528/128, 185, 126, 170, 172, 179, 173, 352, 220, 229; 525/354, 366, 422, 436, 925, 928; 428/473.5; 524/600

[56] References Cited

U.S. PATENT DOCUMENTS

| | | | |
|---|---|---|---|
| 3,310,573 | 3/1967 | Coe | 528/353 |
| 3,705,870 | 12/1972 | Darmory et al. | 528/353 |
| 3,745,149 | 7/1973 | Serafini et al. | 528/353 |
| 3,899,309 | 8/1975 | Hoehn et al. | 29/16 |
| 4,063,984 | 12/1977 | Critchley | 428/458 |
| 4,196,277 | 4/1980 | Jones et al. | 528/208 |

(List continued on next page.)

FOREIGN PATENT DOCUMENTS 1062435 3/1967 United Kingdom .
1216505 12/1970 United Kingdom .

OTHER PUBLICATIONS

Abstract and Papers presented at the Second International Conference on Polyimides, Oct. 30–Nov. 1, 1985, Ellenville, NY, USA–Sponsored by Mid-Hudson Section Society of Plastics Engineers, Inc., "Structure-To-Glass Transition Temperature Relationships In High Temperature Stable Condensation Polyimides" by William B. Alston and Roy F. Gratz, pp. 30–46.

(List continued on next page.)

*Primary Examiner*—John Kight, III
*Assistant Examiner*—P. Hampton-Hightower
*Attorney, Agent, or Firm*—George J. Romanik

[57] ABSTRACT

A fluorinated condensation copolyimide has repeating polymer units that include:

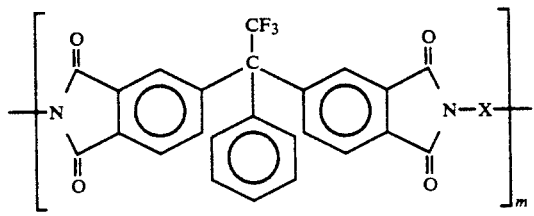

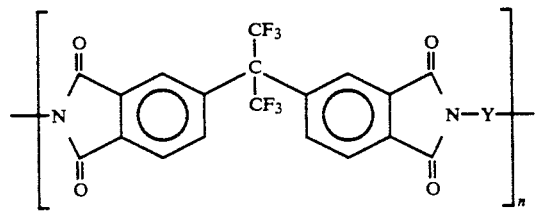

in which X and Y are diamines. The copolyimide can be made by reacting a 3F-monomer and a 6F-monomer with an aromatic or aliphatic diamine. The 3F-monomer includes 4,4'-(2,2,2-trifluoro-1-phenylethylidene) diphthalic anhydride, a dialkylester of 4,4'-(2,2,2-trifluoro-1-phenylethylidene) diphthalic anhydride, 4,4'-(2,2,2-trifluoro-1-phenylethylidene) diphthalic acid, or mixtures thereof. The 6F-monomer includes 4,4'-[2,2,2-trifluoro-1-(trifluoromethyl)ethylidene] diphthalic anhydride, a dialkylester of 4,4'-[2,2,2-trifluoro-1-(trifluoromethyl)ethylidene] diphthalic anhydride, 4,4'-[2,2,2-trifluoro-1-(trifluoromethyl)ethylidene] diphthalic acid, or mixtures thereof.

20 Claims, 1 Drawing Sheet

U.S PATENT DOCUMENTS

| | | | |
|---|---|---|---|
| 4,197,339 | 4/1980 | Paul et al. | 427/370 |
| 4,206,106 | 6/1980 | Heilman et al. | 528/353 |
| 4,244,853 | 1/1981 | Serafini et al. | 528/353 |
| 4,307,024 | 12/1981 | Kray et al. | 528/402 |
| 4,315,080 | 2/1982 | Gagliani et al. | 521/189 |
| 4,336,175 | 6/1982 | Gibbs | 524/726 |
| 4,338,430 | 7/1982 | Edelman | 528/222 |
| 4,395,514 | 7/1983 | Edelman | 524/600 |
| 4,485,140 | 11/1984 | Gannett et al. | 428/260 |
| 4,569,988 | 2/1986 | Scola et al. | 528/353 |
| 4,576,857 | 3/1986 | Gannett et al. | 428/260 |
| 4,742,152 | 5/1988 | Scola | 528/353 |
| 4,758,380 | 7/1988 | Alston et al. | 549/241 |
| 4,801,682 | 1/1989 | Scola | 528/353 |
| 4,863,640 | 9/1989 | Scola | 549/241 |
| 5,091,505 | 2/1992 | Serafini et al. | 528/353 |
| 5,132,395 | 7/1992 | Serafini et al. | 528/353 |
| 5,149,760 | 9/1992 | Serafini et al. | 528/353 |
| 5,149,772 | 9/1992 | Serafini et al. | 528/353 |

OTHER PUBLICATIONS

J. Org. Chem. vol. 42, Nov. 7, 1977, "Synthesis of Multifunctional Triarylfluoroethanes. 1. Condensation of Fluoro Ketones" by William D. Kray and Robert W. Rosser, pp. 1186–1189.

TRW Space & Technology Group Paper on TRW–R-8XX "A Low-cost, Processable, Non-MDA, Ultra-high-temperature Composite Matrix Resin".

Paper presented at the High Temple Workshop XII, Cocoa Beach, Fla., Jan. 27–30, 1992 "Thermo–Oxidative Stability of Polyimides and Polyimide/Graphite Composites At 271° C. (700° F.), 1 and 4 Atmospheres" by Daniel A. Scola and Martin Wai.

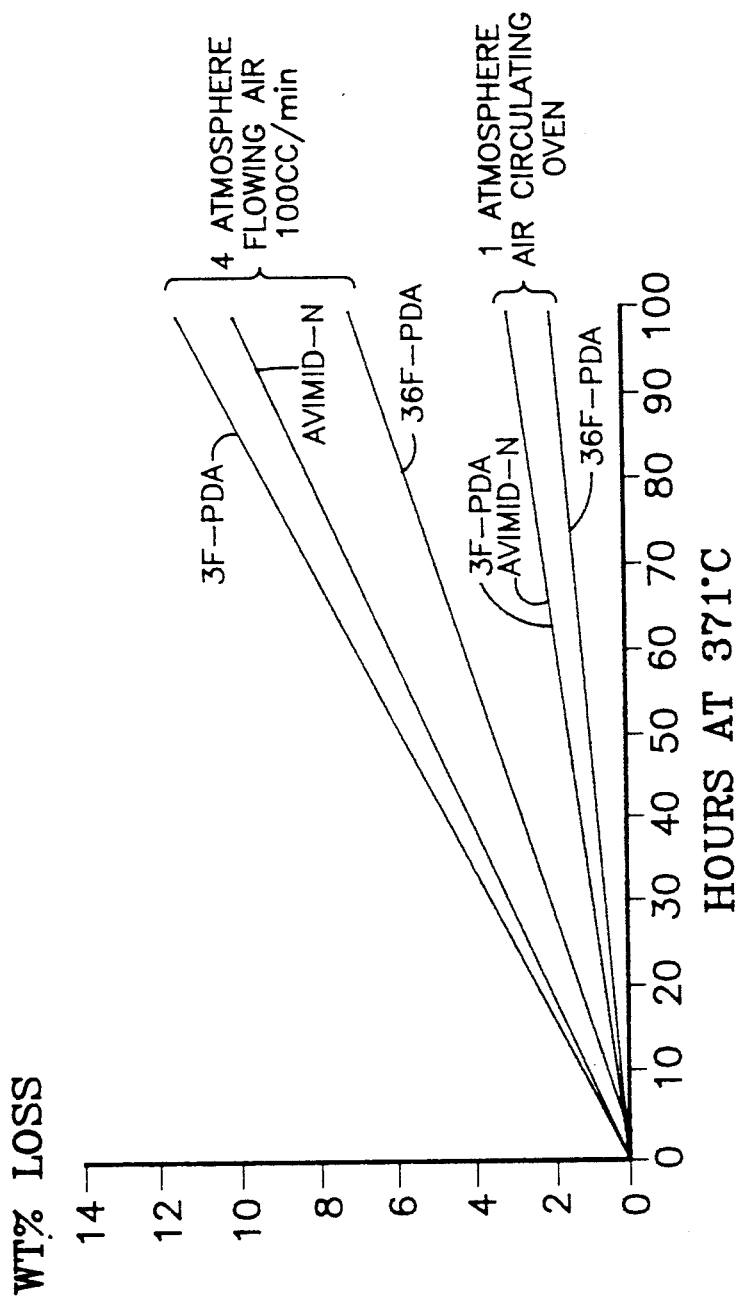

FLUORINATED CONDENSATION COPOLYIMIDES

DESCRIPTION

1. Cross-Reference to Related Application

This application relates to commonly assigned U.S. application Ser. No. 07/985,702, entitled "High Temperature 3F-Polyimides," filed on even date herewith.

2. Technical Field

The present invention is directed to fluorinated polyimide compositions suitable for use at high temperatures.

3. Background Art

In recent years, materials that include polymeric resins have replaced metal components for many aerospace applications. For example, polymeric materials, particularly polymeric composite materials, have been used to make gas turbine engine and missile components. They also have been used in other applications requiring low weight and high strength. Although many applications to date have involved military products, polymeric materials will increasingly be used in civilian products. Two near term civilian applications are advanced commercial gas turbine engines and the High Speed Civil Transport.

When used for gas turbine engines or other aerospace applications, polymeric materials are often exposed to hot air environments that can cause thermal and thermo-oxidative degradation. For example, parts in a gas turbine engine can be exposed to air at temperatures between 315° C. and 400° C. To be suitable for many applications, polymeric materials must resist oxidation or degradation in flowing air at pressures up to 480 kPa (70 psi) and at temperatures that can exceed 370° C.

Polyimide materials, including PMR-II-30, PMR-II-50, PMR-15, AFR-700B, and Avimid-N ™, are among the polymeric materials currently used in aerospace applications. PMR-II-30, PMR-II-50, and PMR-15 were developed by NASA Lewis and are licensed to various companies. AFR-700B was developed by TRW, Inc. (Redondo Beach, Calif.) under contract to the United States Air Force. Avimid-N ™ was developed by E. I. DuPont de Nemours and Company (Wilmington, Del.). A particularly promising group of polyimides are 3F-polyimides, also known as 3F-PI. 3F-PI materials include 3F-PDA. 3F-PDA comprises polymer units having the formula:

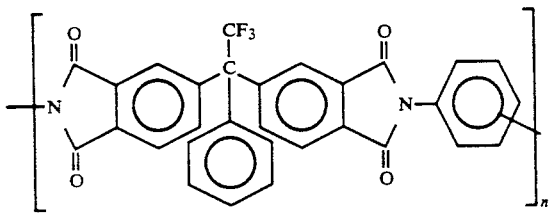

3F-polyimide materials are made by polymerizing 4,4'-(2,2,2-trifluoro-1-phenylethylidene) diphthalic anhydride or a dialkylester of 4,4'-(2,2,2-trifluoro-1-phenylethylidene) diphthalic anhydride with a diamine. 3F-PI materials are described in more detail in commonly assigned U.S. Pat. Nos. 4,742,152, 4,801,682, and 4,863,640, all to Scola. Like other current polyimide materials, 3F-PI materials can have acceptable thermo-oxidative stability under some conditions. It would, however, be desirable to have new polyimide materials with improved thermo-oxidative stability to permit them to function under more severe conditions.

Therefore, what is needed in the industry are polyimide resins that have better thermo-oxidative stability than prior art polyimide resins.

DISCLOSURE OF THE INVENTION

The present invention is directed to polyimide resins that have better thermo-oxidative stability than prior art polyimide resins.

One aspect of the invention includes a fluorinated condensation copolyimide having repeating polymer units comprising:

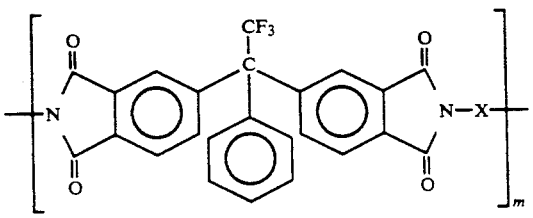

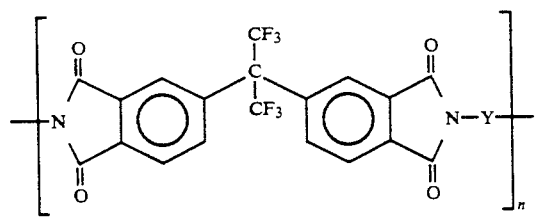

wherein X and Y are diamines.

Another aspect of the invention includes a prepreg having a plurality of reinforcing fibers impregnated with a fluorinated condensation copolyimide having the above formula.

Another aspect of the invention includes a method of making a high temperature fluorinated polyimide by reacting a 3F-monomer and a 6F-monomer with an aromatic or aliphatic diamine to form a 36F-copolyimide having the above formula. The 3F-monomer includes 4,4'-(2,2,2-trifluoro-1-phenylethylidene) diphthalic anhydride, a dialkylester of 4,4'-(2,2,2-trifluoro-1-phenylethylidene) diphthalic anhydride, 4,4'-(2,2,2-trifluoro-1-phenylethylidene) diphthalic acid, or mixtures thereof. The 6F-monomer includes 4,4'-[2,2,2-trifluoro-1-(trifluoromethyl)ethylidene] diphthalic anhydride, a dialkylester of 4,4'-[2,2,2-trifluoro-1-(trifluoromethyl)ethylidene] diphthalic anhydride, 4,4'-[2,2,2-trifluoro-1-(trifluoromethyl)ethylidene] diphthalic acid, or mixtures thereof.

Another aspect of the invention includes a 36F-copolyimide made by the above method.

These and other features and advantages of the present invention will become more apparent from the following description and accompanying drawing.

BRIEF DESCRIPTION OF THE DRAWING

The FIGURE is a graph that shows the thermo-oxidative stability of 36F-PDA, a copolyimide of the present invention, and two other polyimides, 3F-PDA and Avimid-N ™, at two oxidizing conditions.

BEST MODE FOR CARRYING OUT THE INVENTION

Fluorinated condensation copolyimide resins of the present invention (36F-copolyimide or 36F-PI) can be made by reacting a 3F-monomer and a 6F-monomer with an aromatic or aliphatic diamine. Suitable 3F-monomers include 4,4'-(2,2,2-trifluoro-1-phenylethylidene) diphthalic anhydride (3F-dianhydride or 3FDA), a dialkylester of 4,4'-(2,2,2-trifluoro-1-phenylethylidene) diphthalic anhydride (3F-dialkylester or 3FDE), or 4,4'-(2,2,2-trifluoro-1-phenylethylidene) diphthalic acid (3F-tetra acid or 3FTA). Suitable 6F-monomers include 4,4'-[2,2,2-trifluoro-1-(trifluoromethyl)ethylidene] diphthalic anhydride (6F-dianhydride to 6FDA), a dialkylester of 4,4'-[2,2,2-trifluoro-1-(trifluoromethyl)ethylidene] diphthalic anhydride (6F-dialkylester or 6FDE), or 4,4'-[2,2,2-trifluoro-1-(trifluoromethyl)ethylidene] diphthalic acid (6F-tetra acid or 6FTA).

3F-monomers can be made from a series of intermediates including 1,1'-(2,2,2-trifluoro-1-phenylethylidene)-bis(3,4-dimethyl benzene) (3F-tetramethyl or 3FTM). 6F-monomers also can be made from a series of similar intermediates including 4,4'-(hexafluoroisopropylidene)bis(1,2-dimethyl benzene) (6F-tetramethyl or 6FTM). In addition, 6FDA is commercially available from Hoechst-Celanese (Somerville, N.J.).

3F-tetramethyl (3FTM) can be made by a room temperature method or an autoclave method. In the room temperature method, 2,2,2'-trifluoroacetophenone is dissolved in xylene to form a reaction mixture. Ortho-xylene is preferred for the reaction mixture because it yields 1,1'-(2,2,2-trifluoro-1-phenylethylidene)bis(3,4-dimethylbenzene), which has the methyl groups in favorable positions for oxidation to 3FTA. Preferably, the reaction mixture will have a molar excess of xylene of about 5:1 to about 20:1 to improve product yield. Most preferably, the reaction mixture will have a molar excess of xylene of about 10:1 to about 17:1. The reaction mixture also should include about 4 weight percent (wt %) to about 12 wt % of a strong Frieder-Crafts acid catalyst, such as trifluoromethanesulfonic acid. After preparation, the reaction mixture should be stirred at room temperature for about 2 days to about 4 days. While the mixture is stirred, an oily layer and a xylene layer form and solid 3FTM crystallizes from the mixture. The 3FTM should be filtered from the mixture, washed with water or an alcohol/water solution, and dried. Additional product can be collected by recovering the excess xylene by distillation to leave a concentrated oily layer. Upon cooling, the oily layer crystallizes to form solid 3FTM. The 3FTM formed from the oily layer can be filtered, washed in water or an alcohol/water solution, dried, and combined with the main batch of 3FTM. In the autoclave method, a reaction mixture of xylene, 2,2,2'-trifluoroacetophenone, and trifluoromethanesulfonic acid can be mixed at about 125° C. to about 175° C. and atmospheric pressure for about 3 hr to about 5 hr to form 3FTM. The room temperature method is preferred because its yields are better, it is more convenient, and it consumes less energy. The reaction can be written as:

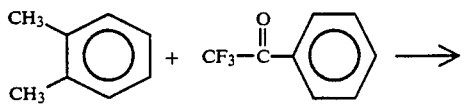
+
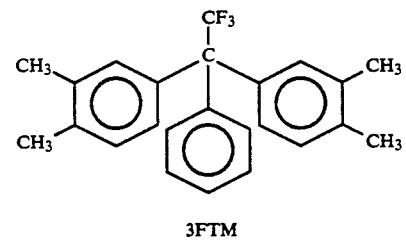

3FTM

The reactants and catalyst for the 3FTM synthesis are available from commercial sources. For example, o-xylene can be purchased from J. T. Baker Chemical Company (Phillipsburg, N.J.). 2,2,2'-trifluoroacetophenone can be purchased from PCR, Inc. (Gainesville, Fla.) and Aldrich Chemical Company (Milwaukee, Wis.). Trifluoromethanesulfonic acid can be purchased from Aldrich Chemical Company and PCR, Inc.

3F-tetra acid (3FTA) can be made by forming a reaction mixture of 3FTM and a nitric acid solution. Nitric acid is available from commercial sources, including J. T. Baker Chemical Co. The concentration of the nitric acid and the molar ratio of nitric acid to methyl groups in the mixture should be selected to limit the formation of nitration products. For example, molar ratios of nitric acid to methyl groups of about 2.2 to about 3.0 with nitric acid concentrations of about 15 wt % to about 24 wt % can be used. Preferably, the molar ratio will be about 2.2 to about 2.5 with a nitric acid concentration of about 20 wt %. Most preferably, the molar ratio of nitric acid to methyl groups will be about 2.5. Higher molar ratios, for example about 3.0 to about 4.6, and higher nitric acid concentrations, for example about 25 wt % to about 37 wt %, can be used, but may produce relatively large amounts of nitration products. To oxidize the 3FTM, the reaction mixture should be heated to an elevated temperature between about 150° C. and about 250° C. and held at the elevated temperature for about 0.5 hr to about 1.5 hr. The rate of temperature rise should be carefully controlled, especially on approaching 180° C., to prevent an exothermic reaction that can increase the quantity of nitration products. Higher temperatures and longer times can be used, but can produce more nitration products. 3FTA can be crystallized from the oxidized reaction mixture by rapidly cooling the mixture, for example to room temperature or cooler, and evaporating the liquid under a vacuum. For example, the liquid can be evaporated in a rotary evaporator operated at a vacuum of about 2.7 kPa (20 mm Hg) to about 4 kPa (30 mm Hg) at about 80° C. Alternately, the oxidized reaction mixture can be allowed to stand for a sufficient time, for example overnight, to allow crystals to form directly from the acid solution. Product that crystallizes from the nitric acid solution can be purer than product produced by evaporation. In both cases, the 3FTA can be further purified by chemically converting it to 3FDA and hydrolyzing the 3FDA back to 3FTA. The 3FTA can be in the form of a pure compound, a monohydrate, or a dihydrate. The dehydrate can be converted to the monohydrate by heating the dehydrate, for example at about 60° C. for about 1 hr in a vacuum. The 3FTA that crystallizes from the nitric acid solution is the pure acid. This reaction can be written as:

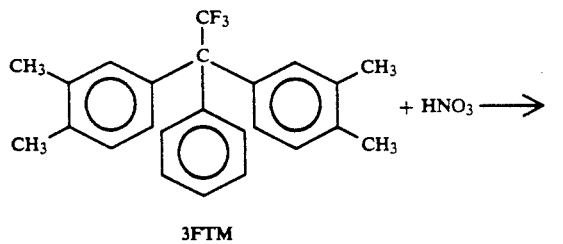

3FTM

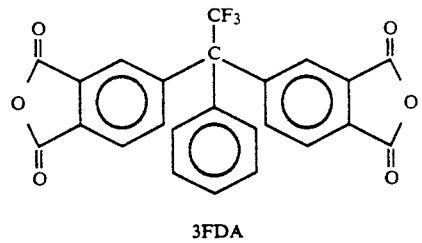

3FDA

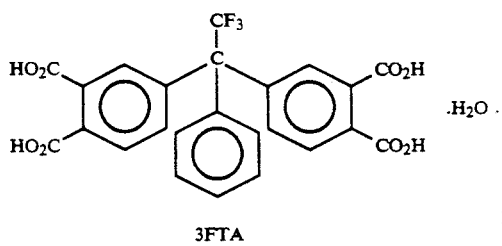

3FTA 3F-dianhydride (3FDA) can be made by dehydrating 3FTA by a thermal method or a chemical method. In the thermal method, 3FTA can be heated to a temperature between about 180° C. and about 250° C. in a vacuum of, for example, about 0.13 kPa (1 mm Hg) to about 4 kPa (30 mm Hg) for about 1 hr to about 3 hr to form water and 3FDA. In the chemical method, 3FTA should be dissolved in a molar excess of an aliphatic anhydride/acid solution, such as acetic anhydride/acetic acid, propionic anhydride/propionic acid, or butanoic anhydride/butanoic acid. An acetic anhydride/acetic acid solution is preferred. A molar excess of about 5:1 to about 15:1 of aliphatic anhydride is preferred. The anhydrides and acids are available from commercial sources, including J. T. Baker Chemical Company and Aldrich Chemical Company. The 3FTA/aliphatic anhydride solution should be heated to reflux conditions and refluxed for about 0.5 hr to about 2 hr before crystallizing 3FDA from the solution. 3FDA can be crystallized by adding xylene, such as o-xylene, to the hot solution. Alternately, the solution can be cooled to a temperature between less than about 0° C. and about 25° C. to precipitate 3FDA crystals. After crystallization, the 3FDA crystals should be washed and dried. A purer 3FDA product can be obtained by recrystallizing the material from an anhydride/acid solution. The chemical method of synthesizing 3FDA is preferred because it produces a purer product and consumes less energy than the thermal method. The reaction can be written as follows:

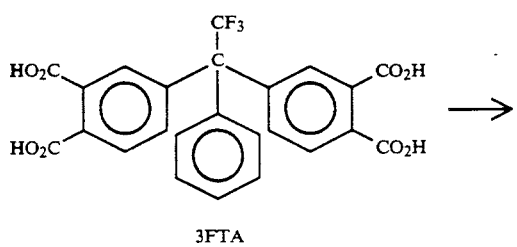

3FTA 3F-dialkylester (3FDE) can be made by refluxing 3FDA with a molar excess of a short chain alcohol, such as reethanol or ethanol, until the 3FDA completely dissolves. This step, which can take about 1 hr to about 4 hr, is controlled by stopping the reflux as soon as the 3FDA dissolves to prevent formation of undesirable triesters or tetraesters. A molar excess of about 5:1 to about 10:1 of the alcohol is preferred. To isolate 3FDE, excess alcohol should be evaporated at a temperature less than about 40° C. under a vacuum of, for example, about 0.13 kPa (1 mm Hg) to about 4 kPa (30 mm Hg) to form an oil. Temperatures greater than about 40° C. can cause the reverse reaction to the dianhydride to occur. The oil can be vacuum dried at about 60° C. to about 100° C. for sufficient time to yield 3FDE crystals. The 3FDE/alcohol solution will be used to form 36F-PI as described below without isolating 3FDE crystals. The diesterification reaction can be written as:

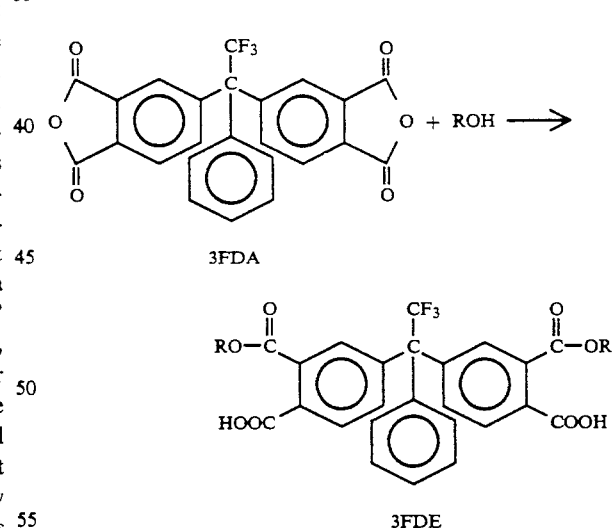

6F-dialkylester (6FDE) can be made by refluxing 6FDA (available from Hoechst-Celanese, Somerville, N.J.) with a molar excess of a short chain alcohol, such as methanol or ethanol, until the 6FDA completely dissolves. This step, which can take about 1 hr to about 4 hr, prevents formation of undesirable triesters or tetraesters. A molar excess of about 5:1 to about 10:1 of the alcohol is preferred. The 6FDE/alcohol solution can be used to form the 36F-PI as described below. The diesterification reaction can be written as:

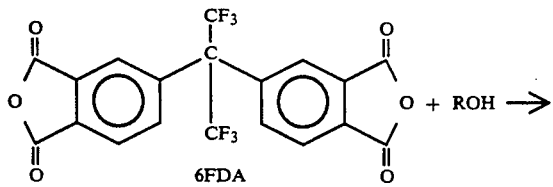

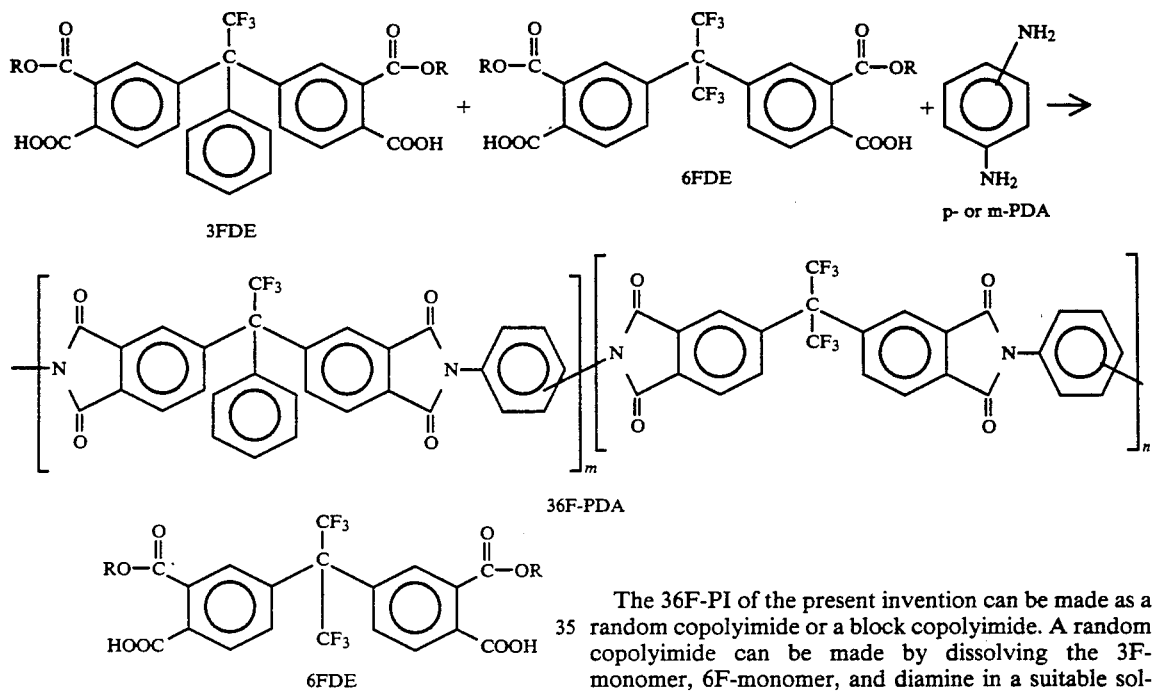

none 3,3'-, 4,4'-, or 3,4'-oxydianiline, 1,2-, 1,3-, 1,4-, 1,5-, 1,6-, 1,7-, 1,8-, 2,3-, 2,4-, 2,5-, 2,6-, 2,7-, or 2,8-diaminonaphthalene, 4,4'-bis(3-aminophenoxy)benzophenone, and 3,3'-diaminodiphenylsulfone. Reacting a 3F-monomer and a 6F-monomer with PDA forms poly [1,4-phenylene-4,4'-(2,2,2-trifluoro-1-phenylethylidene)] bisphthalimide-co-[1,4-phenylene-4,4'-(2,2,2-trifluoro-1-[trifluoromethyl]ethylidene)]bisphthalimide, the 36F-PDA resin. The reaction between 3FDE, 6FDE, and PDA can be written as:

Alternately, a solution of both 3FDE and 6FDE can be made by refluxing 3FDA and 6FDA together with a molar excess of a short chain alcohol.

36F-PI resin can be made by copolymerizing a 3F-monomer and a 6F-monomer with an aromatic or aliphatic diamine. The 3F-monomer may be 3FDA, 3FDE, 3FTA, or mixtures thereof. The 6F-monomer may be 6FDA, 6FDE, 6FTA, or mixtures thereof. Preferably, the diamine will be an aromatic diamine, such as p-phenylene diamine (p-PDA) or a mixture of p-PDA and m-PDA. Most preferably, the diamine will be substantially pure p-PDA. Other suitable diamines include 4,4'-biphenylene diamine and 2,2'-bis(trifluoromethyl)-4,4'-diaminobiphenyl. In addition, the diamine can comprise any of a number of fused aromatic rings such as naphthalene, anthracene, phenanthrene, indene, pyrene, triphenylene, and substituted fused aromatic ring systems. Typically, a naphthalene diamine can have the diamine in the (1,2), (1,3), (1,4), (1,5), (1,6), (1,7), (1,8), (2,3), (2,4), (2,5), (2,6), (2,7), and (2,8) positions. The (1,4), (1,5), (1,7), (2,6), and (2,8) positions are preferred. Typically, an anthracene diamine can have the diamine in the (1,2), (1,3), (1,4), (1,5), (1,6), (1,7), (1,8), (1,9), (1,10), (2,3), (2,4), (2,5), (2,6), (2,7), (2,8), and (2,9) positions. The (1,4), (1,7), (2,6), and (2,9) positions are preferred. The diamine also may comprise any of a number of heteroaromatic ring systems such as quinoline, pyridene, acridine, thiophene, indole, and substituted heteroaromatic ring systems. Examples of additional suitable diamines include 3,3'- or 4,4'-diaminobenzophe- The 36F-PI of the present invention can be made as a random copolyimide or a block copolyimide. A random copolyimide can be made by dissolving the 3F-monomer, 6F-monomer, and diamine in a suitable solvent, such as alcohol, dimethyl acetamide (DMAc), N-methylpyrrolidone (NMP), or diethylene glycol dimethyl ether (diglyme). For example, the solvent can be reethanol or ethanol. The 3F-monomer and 6F-monomer can be used in any proportion. The actual amounts of 3F-monomer and 6F-monomer used to form the 36F-PI can be selected to control the physical properties of the 36F-PI. If the 36F-PI is made directly from a 3FDE solution, a 6FDE solution, or a 3FDE/6FDE solution, the alcohol solvent in the solution can be used to dissolve the diamine. The 3F-monomer and 6F-monomer should be mixed with the diamine at a suitable temperature, for example between about room temperature and about 50° C., for a sufficient time until the reactants dissolve. As the reactants dissolve, they react with each other to form 36F-PI precursors.

A block copolyimide can be made by reacting the 3F-monomer and 6F-monomer separately with diamines. For example, the 3F-monomer, preferably, 3FDA, and diamine can be dissolved in a suitable solvent to form a 3F-polyamic acid solution. Similarly, the 6F-monomer, preferably 6FDA, and diamine can be dissolved in a suitable solvent to form a 6F-polyamic acid solution. If desired, different diamines can be used to make the 3F-polyamic acid solution and 6F-polyamic acid solution. The two polyamic acid solutions can mixed in any proportion and processed into a block copolyimide as described above. The amount of each polyamic acid solution used to form the 36F-PI can be selected to control the physical properties of the 36F-PI.

In forming either the random or block copolyimides, the molar ratio of 3F-monomer and 6F-monomer to diamine can range from about 0.8 to about 1.10. To obtain enhanced thermo-oxidative stability, the (3F-monomer+6F-monomer):diamine ratio can be about 1.05 to about 1.10. Preferably, the (3F-monomer+6F-monomer):diamine ratio in the solution will be about 1.06 to about 1.10 and, most preferably, about 1.08 to about 1.09. As the ratio of (3F-monomer+6F-monomer):diamine increases, the molecular weight of the 36F-PI decreases. As molecular weight decreases, the fracture toughness and other mechanical properties of the material decrease. Therefore, the upper limit of the (3F-monomer+6F-monomer):diamine ratio is set by molecular weight and mechanical property considerations.

The 36F-PI resin of the present invention can be used in solution form to impregnate reinforcing fibers in a prepreg. The fibers may be graphite fibers, glass fibers, kevlar fibers, or any other fibers compatible with 36F-PI and may be woven into a cloth or arranged in any other form or orientation. The 36F-PI itself may be spun into fibers. Alternately, the solvent in the 36F-PI solution can be removed, for example by vacuum drying at about 60° C. for about 1 hr to about 2 hr, to form a powder. The powder can be molded into shaped objects or redissolved in a suitable solvent, such as reethanol or ethanol, for use in advanced coating applications. The 36F-PI resin can be imidized and postcured by conventional methods. For example, the 36F-PI can be heated to about 120° C. for about 1 hr, then to about 220° C. for about 2 hr, and finally to about 275° C. for about 1 hr. The imidized material can be postcured at about 415° C. for about 8 hr.

The following examples demonstrate the present invention without limiting the invention's broad scope.

EXAMPLE 1

Comparative Example Monomer Synthesis; 3F-PDA Synthesis 600 ml (528 g, 4.974 mole) o-xylene (Baker grade, J. T. Baker Chemical Company, Phillipsburg, N.J.), 50 g (0.287 mole) trifluoroacetophenone (PCR, Inc., Gainesville, Fla.), and 25 ml (42.4 g, 0.282 mole) trifluoromethanesulfonic acid (Aldrich Chemical Company, Milwaukee, Wis.) were added to a three neck, round bottom flask to form a reaction mixture. The flask had a reflux condenser and an addition funnel. The reaction mixture was stirred at room temperature for 72 hr, during which time a solid crystallized from the solution. The solid was filtered using a water aspirator, washed with copious amounts of water, air dried, and vacuum dried at 100° C. overnight. The filtrate was separated into an oily layer and a xylene layer. The oily layer was concentrated to one-third its original volume to form additional product. The additional product was filtered, washed with cold water and cold ethanol, vacuum dried at 100° C. overnight, and combined with the major fraction of the solid. The product was a white solid that weighed 81.4 g (77% yield) and had a melting point of 178.5° C. to 180° C. Analysis showed the product to be 3FTM:

calculated for $C_{24}H_{23}F_3$: C, 78.23 wt %; H, 6.29 wt %; F, 15.47 wt % found: C, 78.12 wt %; H, 6.28 wt %; F, 15.47 wt %.

25 g (67.85 mmole) 3FTM and 43.3 ml of a 20 wt % solution of nitric acid (0.6846 mole in 155 ml water) (Baker analyzed, J. T. Baker Chemical Company) were added to a polytetrafluoroethylene-lined 750 ml autoclave (Berghof of America, Inc., Concord, Calif.). The resulting solution had a molar ratio of nitric acid to methyl groups of 2.5. The autoclave was sealed and the temperature was increased to 180° C. over a period of 80 minutes. The temperature was increased slowly to avoid initiating an undesired exothermic reaction. The autoclave was held at 180° C. for 1 hr and then cooled immediately in running tap water. The cooled mixture was removed from the autoclave and placed into a rotary evaporator. The acid was distilled off at 80° C. and a vacuum of 2.7 kPa (20 mm Hg) to 4 kPa (30 mm Hg) to produce a solid residue. The solid residue was dried overnight at 80° C. in a vacuum to yield 13.0 g (92% yield) of a yellow solid with a melting point of 120° C. to 125° C. Analysis showed the product to be the dehydrate of 3FTA:

calculated for $C_{24}H_{19}F_3O_{10}$: C, 54.98 wt %; H, 3.65 wt %; F, 10.87 wt % found: C, 54.70 wt %; H, 3.46 wt %; F, 10.48 wt %.

The monohydrate of 3FTA was obtained by heating the dehydrate at 60° C. for 1 hr in a vacuum. Analysis of the monohydrate showed:

calculated for $C_{24}H_{19}F_3O_9$: C, 56.92 wt %; H, 3.28 wt %; F, 11.26 wt % found: C, 56.21 wt %; H, 3.02 wt %; F, 10.38 wt %.

A solution of 28.16 g (57.66 mmole) 3FTA, 23 ml (24.1 g, 0.236 mole) acetic anhydride (Aldrich Chemical Company), and 13 ml glacial acetic acid (Aldrich Chemical Company) was prepared, heated to reflux conditions, and refluxed for 1.5 hr. The hot solution was gravity filtered and 25 ml o-xylene was added to form crystals immediately.

The mixture was filtered, washed with 10 ml glacial acetic acid and 30 ml o-xylene, and vacuum dried at 105° C. overnight to yield 27.8 g (87% yield) of a white solid with a melting point of 198° C. to 200° C. This product was recrystallized from a solution of 24 ml acetic anhydride and 18 ml acetic acid to yield 25 g (78% yield) of a white sold with a melting point of 201° C. to 202° C. Analysis showed the product to be 3FDA:

calculated for $C_{24}H_{11}F_3O_6$: C, 63.72 wt %; H, 2.45 wt %; F, 12.60 wt % found: C, 63.62 wt %; H, 2.39 wt %; F, 12.48 wt %.

10.0 g (22.108 mmole) 3FDA and 12.3 ml (0.221 mole) absolute ethanol (Quantum Chemical Corporation, USI Division, Cincinnati, Ohio) were added to a 50 ml round bottom flask. The mixture was refluxed for 1 hr to dissolve the 3FDA completely. 2.2044 g (20.385 mmole) of P-PDA were added to the 3FDA solution to produce a 3F-monomer:diamine molar ratio of 1.0845. The solution was stirred at room temperature until the p-PDA dissolved. As the p-PDA dissolved, the solution turned from light amber to brown to deep purple. The solution was concentrated on a hot plate at 50° C. to form a viscous liquid and was then dried under a vacuum at 60° C. for 2 hr to form a purple crystalline solid. The crystalline solid was imidized by heating it to 125° C. for 2 hr, then to 220° C. for 2 hr, and, finally, to 275° C. for 1 hr to yield 11 g of a brown-purple powder. The powder was compression molded into discs by heating it to 371° C. and applying 69 kPa (1000 psi) pressure for 4 hr. The discs were then postcured by heating them at 415° C. for 8 hr.

EXAMPLE 2

36F-PDA Random Copolyimide Synthesis 10.0 g (22.108 mmole) of 3FDA made as in Example 1 and 9.8209 g (22.108 mmole) of 6FDA (Hoechst-Celanese, Somerville, N.J.) were added to a 200 ml round bottom flask. 53 ml (41.8 g, 0.91 mole) of absolute ethanol (Quantum Chemical Corporation, USI Division) were added to the flask. The mixture was heated to reflux conditions, refluxed for 45 min to dissolve the 3FDA and 6FDA completely, and cooled to room temperature. 4.4089 g (40.77 mole) of p-PDA were added to the mixture to produce a (3F-monomer+6F-monomer):diamine molar ratio of 1.0845. The mixture was stirred and warmed to 50° C. until the p-PDA dissolved to form a 36F-PDA solution. The 36F-PDA was then crystallized, imidized, and formed into discs as in Example 1.

EXAMPLE 3

36F-PDA Block Copolyimide Synthesis Prospective Example

A solution of 10.0 g (22.108 mmole) of 3FDA in 100 ml DMAc is added to a solution of 2.2044 g (20.385 mmole) of p-PDA in 25 ml DMAc dropwise over 0.5 hr while stiffing at room temperature. A solution of 9.3640 g (22.108 mmole) of 6FDA in 100 ml DMAc is added to a solution of 2.2044 g (20.385 mmole) of p-PDA in 25 ml DMAc dropwise over 0.5 hr while stirring at room temperature. The two solutions are mixed and processed as in Example 1.

EXAMPLE 4

36F-PDA Block Copolyimide Synthesis Prospective Example

A solution of 10.796 g (22.108 mmole) of 3FTA in 100 ml DMAc is added to a solution of 2.2044 g (20.385 mmole) of p-PDA in 25 ml DMAc dropwise over 0.5 hr while stiffing at room temperature. A solution of 9.702 g (22.108 mmole) of 6FDA in 100 ml DMAc is added to a solution of 2.2044 g (20.385 mmole) of p-PDA in 25 ml DMAc dropwise over 0.5 hr while stirring at room temperature. The two solutions are mixed and processed as in Example 1.

EXAMPLE 5

Comparative Example 6F-PDA Synthesis 10.0 g (22.5 mmole) of 6FDA (Hoechst-Celanese) were added to a 50 ml round bottom flask. 12.3 ml (9.7 g, 0.211 mole) of absolute ethanol (Quantum Chemical Corporation, USI Division) were added to the flask. The mixture was heated to reflux conditions, refluxed to dissolve the 6FDA completely, and cooled to room temperature. 2.371 g (21.93 mmole) of a mixture of 95 % p-PDA and 5 % M-PDA were added to the 6FDA mixture to produce a 6F-monomer:diamine molar ratio of 1.0260. The mixture was stirred at room temperature until the PDA dissolved to form a 6F-PDA solution. The 6F-PDA was then crystallized, imidized, and formed into discs as in Example 1.

EXAMPLE 6

Comparative Example Avimid-N ™ Extraction

Avimid-N ™ resin (E. I. DuPont De Nemours and Company, Wilmington, Del.), which comprises 6FDA, M-PDA, and p-PDA, was extracted from an Avimid-N ™ G30-500 graphite cloth prepreg (DuPont) with reethanol. Extraction of the resin was considered complete when a colorless extract and a flexible graphite cloth (when dry) were obtained. Resin powder and discs were prepared as in Example 1.

The discs prepared in the Examples were used in isothermal thermo-oxidative stability studies to determine their thermo-oxidative stability. The studies were carried out at 101 kPa (1 atm) and 405 kPa (4 atm) in a Blue M (Blue Island, Ill.) oven Model IGF-668OF-4. The 101 kPa studies were done at 371° C. in circulating air by placing the specimens on top of an autoclave, which was placed in the oven. The 405 kPa studies were done at 371° C. in an air flow of 100 ml/min by placing the specimens in an autoclave. In both studies, the specimens were weighed before and after the studies to determine weight loss. Data for the 101 kPa studies are presented in Table 1.

TABLE 1

| Example (Resin) | Ratio monomer:diamine | Ratio p-PDA/m-PDA | % Wt Loss After 100 hr |
|---|---|---|---|
| 1 3F-PDA | 1.0845 | 100/0 | 3.1 |
| 2 36F-PDA | 1.0845 | 100/0 | 1.8 |
| 5 6F-PDA (Avimid-N ™ Control) | 1.0232 | 95/5 | 3.3 |
| 6 Avimid-N ™ | — | — | 3.1 |

The data in Table 1 show that the thermo-oxidative stability of the 36F-PDA copolyimide of the present invention is superior to 3F-PDA, 6F-PDA, and Avimid-N ™.

TABLE 2

| Example (Resin) | Ratio monomer:diamine | Ratio p-PDA/m-PDA | % Wt Loss After | | | | |
|---|---|---|---|---|---|---|---|
| | | | 10 hr | 25 hr | 50 hr | 75 hr | 100 hr |
| 1 3F-PDA | 1.0845 | 100/0 | 0.98 | 2.66 | 8.71 | 8.5 | 12.1 |
| 2 36F-PDA | 1.0845 | 100/0 | — | 1.57 | 3.40 | 6.04 | 9.1 |
| 5 6F-PDA | 1.0232 | 95/5 | 1.12 | 2.54 | 5.07 | 7.65 | 12.2 |
| 6 Avimid-N ™ | — | — | 1.61 | 2.30 | 4.26 | 6.1 | 10.5 |

The data in Table 2 also show that the thermo-oxidative stability of the 36F-PDA copolyimide of the present invention is superior to 3F-PDA, 6F-PDA, and Avimid-N ™. The FIGURE summarizes data for 3F-PDA, Avimid-N ™, and 36F-PDA from both tables.

The invention is not limited to the particular embodiments shown and described herein. Various changes and modifications may be made without departing from the spirit or scope of the claimed invention.

I claim:
1. A fluorinated condensation copolyimide having repeating polymer units comprising:

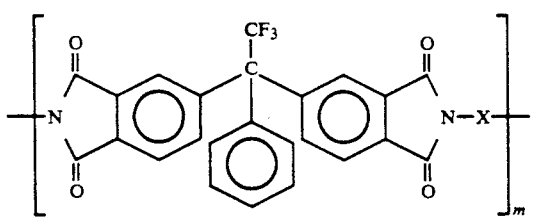

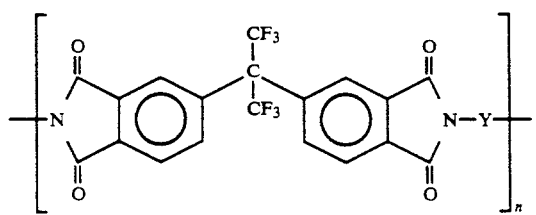

wherein X and Y are aromatic or aliphatic diamines.

2. The copolyimide of claim 1, wherein X and Y are selected from the group consisting of phenylene diamine, 4,4'-biphenylene diamine, and 3,3'-trifluoromethyl-4,4'-biphenylene diamine.

3. The copolyimide of claim 1, wherein X and Y are p-phenylene, m-phenylene, or a mixture of p-phenylene and m-phenylene and the 36F-copolyimide is poly [1,4-phenylene-4,4'-(2,2,2-trifluoro-1-phenylethylidene)] bisphthalimide-co-[1,4-phenylene-4,4'-(2,2,2-trifluoro-1-[trifluoromethyl]ethylidene)] bisphthalimide.

4. A prepreg, comprising:
a plurality of reinforcing fibers impregnated with a fluorinated condensation copolyimide having repeating polymer units comprising:

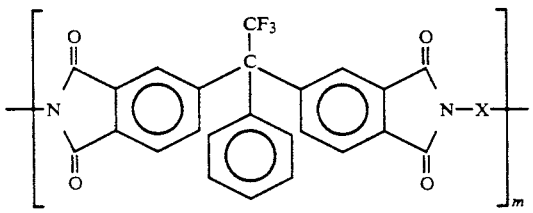

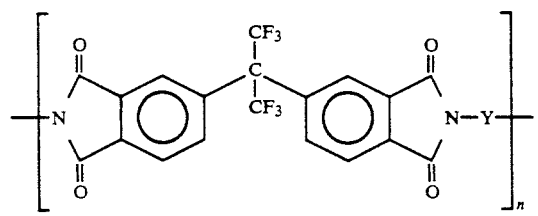

wherein X and Y are aromatic or aliphatic diamines.

5. The prepreg of claim 4, wherein X and Y are selected from the group consisting of phenylene diamine, 4,4'-biphenylene diamine, and 2,2'-bis(trifluoromethyl)-4,4'-diaminobiphenyl.

6. The prepreg of claim 4, wherein X and Y are p-phenylene, m-phenylene, or a mixture of p-phenylene and m-phenylene and the 36F-copolyimide is poly [1,4-phenylene-4,4'-(2,2,2-trifluoro-1-phenylethylidene)] bisphthalimide-co-[1,4-phenylene-4,4'-(2,2,2-trifluoro-1-[trifluoromethyl]ethylidene)] bisphthalimide.

7. A method of making a high temperature fluorinated polyimide, comprising the step of:
reacting a 3F-monomer and a 6F-monomer with an aromatic or aliphatic diamine to form a 36F-copolyimide having the formula:

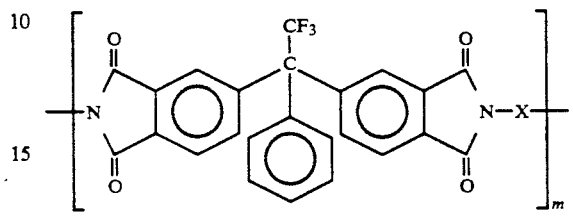

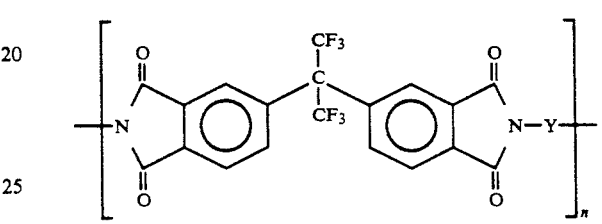

wherein X and Y are aromatic or aliphatic diamines, the 3F-monomer comprises 4,4'-(2,2,2-trifluoro-1-phenylethylidene) diphthalic anhydride, a dialkylester of 4,4'-(2,2,2-trifluoro-1-phenylethylidene) diphthalic anhydride, 4,4'-(2,2,2-trifluoro-1-phenylethylidene) diphthalic acid, or mixtures thereof, and the 6F-monomer comprises 4,4'-[2,2,2-trifluoro-1-(trifluoromethyl)ethylidene] diphthalic anhydride, a dialkylester of 4,4'-[2,2,2-trifluoro-1-(trifluoromethyl)ethylidene] diphthalic anhydride, 4,4'-[2,2,2-trifluoro-1-(trifluoromethyl)ethylidene] diphthalic acid, or mixtures thereof.

8. The method of claim 7, wherein the 3F-monomer and 6F-monomer are reacted with the diamine by:
(a) forming a solution comprising the 3F-monomer, 6F-monomer, and diamine;
(b) mixing the solution so the 3F-monomer and 6F-monomer react with the diamine to form random 36F-copolyimide precursors; and
(c) imidizing the precursors to form the 36F-copolyimide.

9. The method of claim 7, wherein the 3F-monomer and 6F-monomer are reacted with the diamine by:
(a) forming a first solution comprising the 3F-monomer and a first aromatic or aliphatic diamine;
(b) forming a second solution comprising the 6F-monomer and a second aromatic or aliphatic diamine;
(c) mixing the first and second solutions to form block 36F-copolyimide precursors; and
(d) imidizing the precursors to form the 36F-copolyimide.

10. The method of claim 7, wherein the ratio of the 3F-monomer plus the 6F-monomer to the diamine is greater than 1.05.

11. The method of claim 7, wherein the ratio of the 3F-monomer plus the 6F-monomer to the diamine is about 1.06 to about 1.10.

12. The method of claim 7, wherein the ratio of the 3F-monomer plus the 6F-monomer to the diamine is about 1.08 to about 1.09.

13. The method of claim 7, wherein the diamine is selected from the group consisting of phenylene diamine, 4,4'-biphenylene diamine, and 2,2'-bis(trifluoromethyl)-4,4'-diaminobiphenyl.

14. The method of claim 7, wherein the diamine is p-phenylene, m-phenylene, or a mixture of p-phenylene and m-phenylene and the 36F-copolyimide is poly [1,4-phenylene-4,4'-(2,2,2-trifluoro-1-phenylethylidene)] bisphthalimide-co-[1,4-phenylene-4,4'-(2,2,2-trifluoro-1-[trifluoromethyl]ethylidene)] bisphthalimide.

15. A 36F-copolyimide made by the method of claim 7.

16. The 36F-copolyimide of claim 15, wherein the ratio of the 3F-monomer plus the 6F-monomer to the diamine is greater than 1.05.

17. The 36F-copolyimide of claim 15, wherein the ratio of the 3F-monomer to the diamine is about 1.06 to about 1.10.

18. The 36F-copolyimide of claim 15, wherein the ratio of the 3F-monomer to the diamine is about 1.08 to about 1.09.

19. A 36F-copolyimide made by the method of claim 8.

20. A 36F-copolyimide made by the method of claim 9.

* * * * *